United States Patent
Kreter et al.

(10) Patent No.: US 11,410,371 B1
(45) Date of Patent: *Aug. 9, 2022

(54) CONVERSION OF OBJECT-RELATED TRAFFIC SENSOR INFORMATION AT ROADWAYS AND INTERSECTIONS FOR VIRTUAL DYNAMIC DIGITAL REPRESENTATION OF OBJECTS

(71) Applicant: ITERIS, INC., Santa Ana, CA (US)

(72) Inventors: Todd W. Kreter, Irvine, CA (US); Michael T. Whiting, Rancho Santa Margarita, CA (US); Peter Chen, Irvine, CA (US)

(73) Assignee: ITERIS, INC., Santa Ana, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/368,748

(22) Filed: Jul. 6, 2021

Related U.S. Application Data

(63) Continuation of application No. 17/216,021, filed on Mar. 29, 2021, now Pat. No. 11,055,894.

(51) Int. Cl.
| | |
|---|---|
| *G06T 13/80* | (2011.01) |
| *G06T 11/60* | (2006.01) |
| *G06V 20/54* | (2022.01) |

(52) U.S. Cl.
CPC .............. *G06T 13/80* (2013.01); *G06T 11/60* (2013.01); *G06V 20/54* (2022.01); *G06V 2201/08* (2022.01)

(58) Field of Classification Search
CPC ......... G06T 13/80; G06T 11/60; G06V 20/54; G06V 2201/08
See application file for complete search history.

(56) References Cited

U.S. PATENT DOCUMENTS

| | | | |
|---|---|---|---|
| 10,719,966 B1 | 7/2020 | Davis et al. | |
| 11,055,894 B1 | 7/2021 | Kreter et al. | |
| 2019/0325230 A1 | 10/2019 | Nadler | |
| 2020/0160151 A1* | 5/2020 | Urtasun | G06V 20/56 |
| 2021/0056852 A1* | 2/2021 | Lund | G08G 1/163 |
| 2021/0097286 A1 | 4/2021 | Lehrich et al. | |

\* cited by examiner

*Primary Examiner* — Grace Q Li
(74) *Attorney, Agent, or Firm* — Lazaris IP

(57) ABSTRACT

A platform for visualization of traffic information at an observed roadway or traffic intersection converts data collected from sensors for rendering as dynamic animations on a virtual map of the observed roadway or traffic intersection. The platform parses and curates incoming sensor data from either a single or multiple sensors representing one or more objects at the observed roadway or traffic intersection, and translates at least location data of each object for correlation of the object's movement relative to the observed roadway or traffic intersection. The platform then generates dynamic animations of the movement of each object and displays the animations as an overlay on the virtual map.

28 Claims, 4 Drawing Sheets

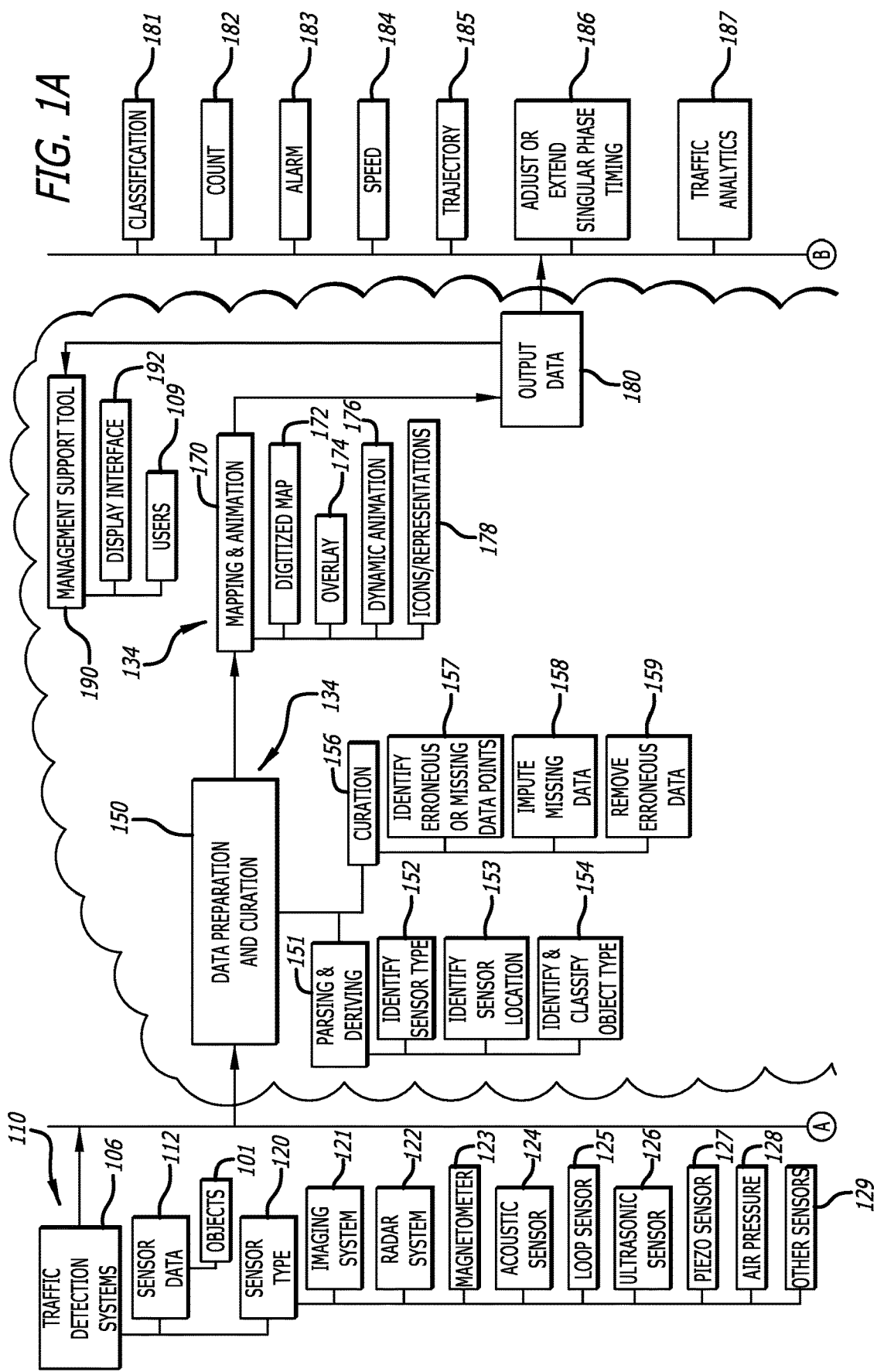

CONVERSION OF OBJECT-RELATED TRAFFIC SENSOR INFORMATION AT ROADWAYS AND INTERSECTIONS FOR VIRTUAL DYNAMIC DIGITAL REPRESENTATION OF OBJECTS

CROSS-REFERENCE TO RELATED PATENT APPLICATION(S)

This patent application claims priority to, and is a continuation of, U.S. non-provisional application Ser. No. 17/216,021, filed on Mar. 29, 2021, the contents of which are incorporated in their entirety herein. In accordance with 37 C.F.R. § 1.76, a claim of priority is included in an Application Data Sheet filed concurrently herewith.

FIELD OF THE INVENTION

The present invention relates generally to the field of traffic management. More specifically, the present invention relates to systems and methods of enhanced traffic observation and monitoring, by capturing information from a single or multiple sensors, fusing the information together, and outputting a combined view and animation of the information for improved viewing, interpretation and analysis of intersection usage and movement.

BACKGROUND OF THE INVENTION

Since the 1930s, sensors have been used to detect vehicles on roadways and at intersections, and this information has been utilized in various ways to manage traffic flow. Most commonly, sensor information has been used locally at a particular intersection to provide efficient actuation of the traffic signal at that intersection. Sensors and traffic flow management have evolved in the decades since, and with the advent of newer detection systems such as video and radar, sensors became able to detect and enable classification of different types of vehicles and road users. Use of such sensors are now standard practice to actuate traffic signals to provide indication of a red light or a green light for approaching vehicles at intersections. Information collected from such sensors is also regularly used for counting of the different vehicles and roadway users, and can be used by cities, counties and states to identify road usage, find traffic anomalies, and plan for future traffic flow.

Radar systems are commonly used to monitor traffic and provide information to traffic signal controllers to actuate the traffic signals at the different approaches. Additionally, images collected from video detection cameras are often viewable at a remote or central site to allow traffic engineers to see what is occurring at a particular intersection. For example, some traffic control agencies employ a remotely-movable camera that can be steered to view different areas of the intersection, and having pan, tilt, and zoom functions, to enable different views, angles, and focal lengths at such locations.

Despite advances in traffic detection systems such as video and radar, traffic engineers and those involved in transportation planning remain interested in real-time information for all traffic within their jurisdiction, and being able to view such real-time information in a manner that enhances their ability to carry out transportation policy and monitor and manage traffic flows on busy roadways. Existing technology however lacks an approach that allows the traffic monitoring and control community to visualize traffic information and flow by viewing all of the traffic at each intersection on a real-time or near real-time basis.

Modern approaches such as ATMS (Advanced Traffic Management Systems) attempt to do this by providing information that is presented as a digitized overlay on a map. This information includes a traffic controller's signal state (such as red, yellow, green) as well as timing information, and information about crosswalk actuation and equipment status. Such systems lack detail on type, location and movement of specific roadways users present at an intersection.

Accordingly, there is a need in the existing art for improvements in monitoring of traffic information. There is a further need in the existing for approaches to visually presenting details of roadway users together with other relevant information about a roadway or intersection for traffic management. Still further, there is a need in the existing art for processing traffic data collected from multiple sensors, curating such data for presentation to a user, and translating such data into a format that enables real-time visualization on a display interface.

BRIEF SUMMARY OF THE INVENTION

The present invention provides a framework for presenting information collected by traffic sensors, in one or more systems and methods for creating dynamic digital representations of roadway uses identified in sensor data for display as an overlay on a digitized intersection or roadway map for human viewing on a display interface. This framework is embodied in a traffic visualization platform that processes sensor data in a traffic detection area on an observed roadway or at or near an observed traffic intersection to identify characteristics of specific objects in the sensor data, curates this processed data to identify missing and erroneous information, and translates information representing each object to derive location data that is then converted into real-time geospatial coordinates that are relative to images of the observed roadway or traffic intersection. The platform then creates digital representations of roadway users, and generates dynamic animations of this information for display as an overlay on a map of the observed roadway or traffic intersection for human viewing, together with other relevant traffic and/or signal information.

It is therefore one objective of the present invention to provide a system and method for collecting data relating to multiple objects and representing different roadway users present at a roadway or traffic intersection from different types of sensors, and visually representing the multiple objects for improvements in traffic management. It is another objective of the present invention to parse the data from different types of sensors to identify different types objects, and discern their location and movement relative to an observed roadway or traffic intersection. It is still another objective to curate the data from the different types of sensors to identify missing and erroneous information. It is a further objective to derive location data for each object, and represent the location as real-time geospatial coordinates relative to the observed roadway intersection, in preparation for digitized representations of the objects.

It is still a further objective of the present invention to provide a system and method of presenting dynamic animations of these roadway users and their type, location, and motion, and as an overlay on a map of the observed roadway or traffic intersection. It is yet another objective of the present invention to provide these dynamic animations as digital representations of real-time activity at the observed roadway or traffic intersection on a display interface for human viewing, to enable improvements in traffic management. It is yet a further object of the present invention to provide systems and methods of applying such digital representations of real-time activity at the observed roadway or traffic intersection to generate outputs to a traffic signal controller to aid in operational efficiency and traffic management, for example to adjust phase cycle times.

Other objects, embodiments, features and advantages of the present invention will become apparent from the following description of the embodiments, taken together with the accompanying drawings, which illustrate, by way of example, the principles of the invention.

BRIEF DESCRIPTION OF THE SEVERAL VIEWS OF THE DRAWINGS

The accompanying drawings, which are incorporated in and constitute a part of this specification, illustrate several embodiments of the invention and together with the description, serve to explain the principles of the invention.

FIGS. 1A-1B are a systemic diagram illustrating elements of a traffic visualization platform according to the present invention;

DETAILED DESCRIPTION OF THE INVENTION

In the following description of the present invention, reference is made to the exemplary embodiments illustrating the principles of the present invention and how it is practiced. Other embodiments will be utilized to practice the present invention and structural and functional changes will be made thereto without departing from the scope of the present invention.

Figure 1B:
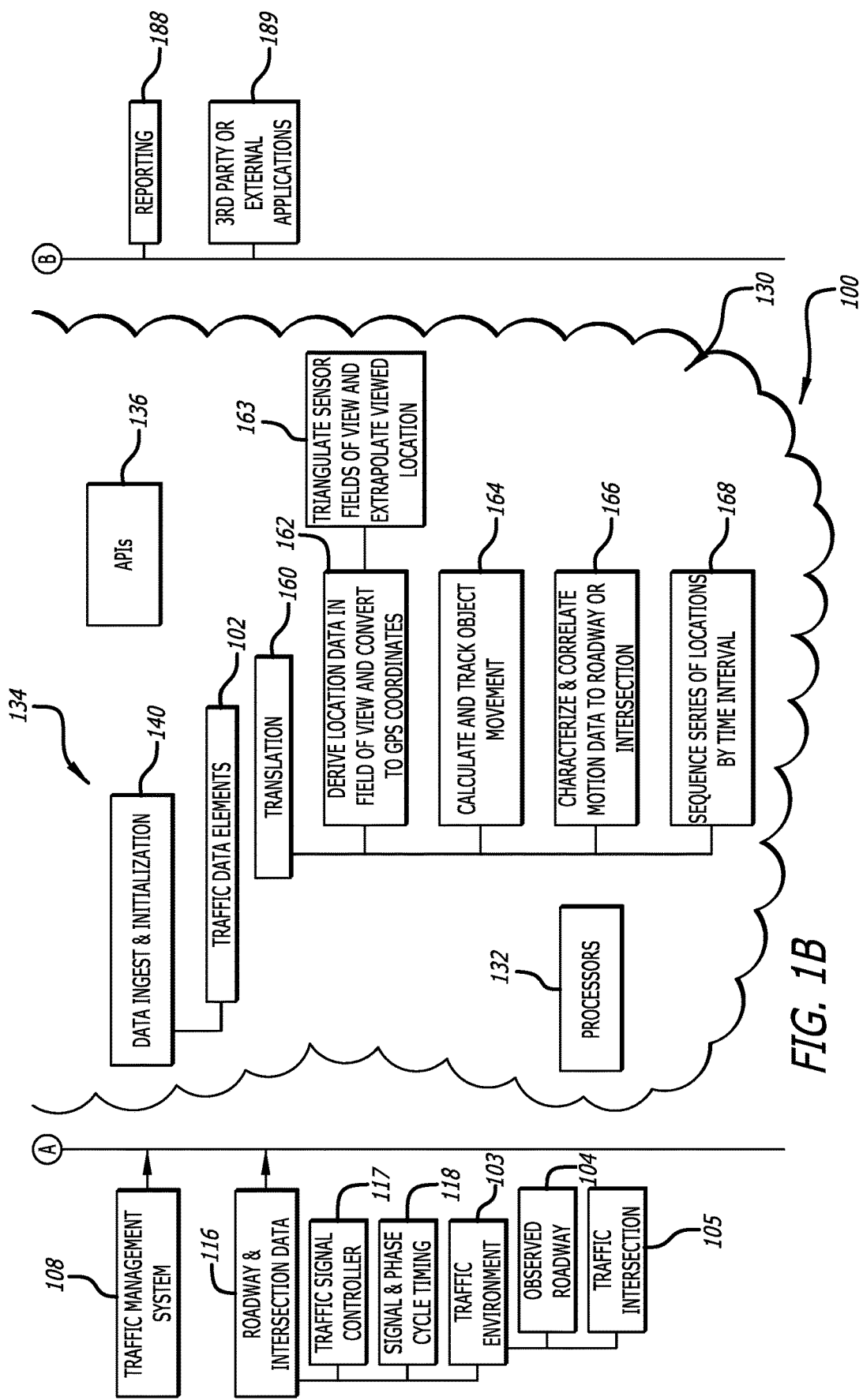

FIG. 1A and FIG. 1B together show a system diagram of a traffic visualization platform 100 for representation of objects 101 and other traffic data elements 102 in a transportation environment 103, such as an observed roadway 104 or traffic intersection 105, by a traffic detection system 106. Such a traffic visualization platform 100 is configured to create a dynamic animation 176 of objects 101 as an overlay 176 on a digitized map 172 of the transportation environment 103, for use in a traffic management system 108 to at least realize improvements in traffic intersection control and public safety.

In such a traffic visualization platform 100, input data 110 in the form of sensor data 112 and captured by one or more types of sensors 120 is processed to detect, identify, and render objects 101 for digital, virtual representation 174 thereof on a display interface 192. The traffic visualization platform 100 is performed within one or more systems and/or methods that includes several components, each of which define distinct activities and functions for processing input data 110 from the different types of sensors 120, and for accurately characterizing attributes of the objects 101.

The traffic visualization platform 100 ingests, receives, requests, or otherwise obtains input data 110 that represents observations of activity in the transportation environment 103, such as an observed roadway 104 or observed traffic intersection 105, as noted above. Input data 110 is obtained from one or more sensors 120 that are part of a traffic detection system(s) 108. Such sensors 120 may be positioned in or near a roadway 104 or traffic intersection 105, for example proximate to a traffic signal controller, and may include imaging systems 121 such as cameras (including RGB, video, or thermal cameras), radar systems 122, magnetometers 123, acoustic sensors 124, loops 125, ultrasonic sensors 126, piezoelectric sensors 127, air pressure tubes 128, and any other sensors, devices or systems 129 which are capable of detecting a presence of objects 101 within a transportation environment 103. For example, sensors 120 may further include light-based (such as ultraviolet, visible, or infrared light) or laser-based sensing systems, such as LiDAR. It is to be understood that any combination of such sensors 120 may be used to detect objects 101 within a traffic detection system 108.

Input data 110 may also other types of traffic data elements 102 that represent traffic or object-related information pertaining to an observed roadway 104 or observed traffic intersection 105, which may or may not be provided by or derived from sensor data 112 collected by the one or more sensors 120. These other types of information may also be included in or together with the dynamic animation 176 as an overlay 174 on a map 172 together with other digital, virtual representations, or icons 178, representing objects 101 and any other related information. For example, input data 110 may include speed data 114 for the roadway 104 or traffic intersection 105, such as a posted speed limit, an average estimated speed, and a current estimated speed. This type of information may be maintained and provided by a traffic signal controller 117, or supplied by $3^{rd}$ party providers, and may be the product of surveys, taken over time, of actual roadway usage. Alternatively, such speed data 114 may also be derived from the sensor data 112, (for example, an average estimated speed or current estimated speed for all vehicles for the observed roadway 104 or traffic intersection 105.)

Input data 110 may also include roadway and intersection data 116. This may include, for example, data provided by a traffic signal controller 117 (such as information identifying the traffic signal controller 117 and its location) and data related to the observed roadway 104, the traffic intersection 105 itself, and any other approach thereto. Examples of data related to the observed roadway 104 or the traffic intersection 105 include the number lanes, the type of roadway 104 or intersection 105, the configuration of the intersection 105, the latitude and longitude (positional coordinates) of the roadway 104 or traffic intersection 105, and any other relevant geometric or geographical information for the particular location.

Roadway and intersection data 116 may further include signal and phase cycle timing data 118, and any other information that may be useful for digital, virtual representation as an overlay on a map of the transportation environment in conjunction with a dynamic animation 176 of objects 101 relative to the observed roadway 104 or traffic intersection 105.

Input data 110 collected from the traffic detection system 108 and sensors 120 is applied to a plurality of data processing elements 134 in the traffic visualization platform 100 that are components within a computing environment 130 that also includes one or more processors 132 and a plurality of software and hardware components. The one or more processors 132 and plurality of software and hardware components are configured to execute program instructions or routines to perform the mathematical functions, algorithms, machine learning, and other analytical approaches comprising the data processing functions described herein, and embodied within the plurality of data processing elements 134.

The plurality of data processing elements 134 include a data ingest and initialization element 140 that is configured to ingest, receive, request, or otherwise obtain the input data 110 as noted above, and initialize the input data 110 for further processing within the traffic visualization platform 100. The plurality of data processing elements 134 also include a data preparation and curation element 150, configured to execute one or more algorithms that parse 151 information in the sensor data 112 and curate 156 the parsed information to identify missing and erroneous values among the input data 110. The plurality of data processing elements 134 further include a translation element 160 that is configured to execute one or more algorithms to translate location and movement characteristics for each object 101 detected by sensors 120, and correlate such information with positional coordinates relative to the observed roadway 104 and traffic intersection 105, in preparing for subsequent mapping and animation functions and presentation of output data 180.

The plurality of data processing elements 134 may further include other components, such as a mapping and animation element 170 that is configured to prepare translated input data 110 for display on an interface 192 for users 109 of a traffic management system 108. The mapping animation element 170 executes one or more algorithms to perform the mapping, overlay, and animation functions, as well as creating icons representing roadway users based on the objects 101, for display on the interface 192. Each of the maps 172, overlays 174, dynamic animations 176, and icons 178 generated by the mapping and animation element 170 may be prepared, for example, by packaging the derivative data into appropriate packets for rendering on a display interface 192.

These data processing elements 134 are configured to generate output data 180 that may take many different forms, and which may or may not be presented as part of information displayed to a user 109 on the interface 192. Output data 180 may include a classification 181 of one or more objects 101 detected by the traffic detection system 106, and a count 182 of each of the one or more objects 101, according to one or more embodiments of the present invention. The output data 180 may also include an alarm 183, such as a verbal, visual, aural, or other indicator on the display interface 192, for example to indicate that an incident has been detected by the traffic detection system 106 or to warn of various activities that can cause abnormal pedestrian and vehicle movements, such as prone objects or pedestrians that may have fallen to the pavement, or the presence of unauthorized vehicles in a pedestrian area. Output data 180 may include specific, calculated object characteristics, such as for example an object's speed 184 and trajectory 185. Other outputs are also possible, such as an instruction to adjust or extend 186 traffic signal controller phase timing as a result of objects 101 preset in the roadway 104 or traffic intersection 105, or in response to those calculated characteristics of objects 101 present at the roadway 104 or traffic intersection 105. Output data 180 may include functions such as traffic analytics 187 and reporting 188. Output data 180 may be provided to one or more third party or external applications 189 for additional analytics and processing therein, such as for example an external traffic management system or a particular traffic signal controller.

The traffic visualization platform 100 of the present invention may also include a traffic management support tool 190, as discussed further herein, and such a tool 190 is one way that a user may view and interact with the display interface 192 on which the animation, digitized representation, overlay, and mapping functions are executed for presentation of information created therein to the user 109. For example, one or more of the maps, overlays, dynamic animations, and other digital representations may be recorded, stored in a database, and played back at a later time. It is to be understood however that such follow-on functions may or may not be executed through the management support tool 190, and that therefore the user 192 may utilize other approaches to storing, recording, and playing back information on a display interface, as well as for performing other functions for processing data within the traffic visualization platform 100.

As noted above, the traffic visualization platform 100 includes a data preparation and curation element 150, which is configured to process the input data 110 by parsing 151 information in the sensor data 112, and curating 156 the parsed information to identify missing and erroneous values among the input data 110, impute missing values, and remove or delete erroneous, redundant, anomalous, stagnant, or otherwise unhelpful values. Each of the parsing 151 and curating 156 aspects of the data preparation and curation element 150 are performed by executing one or more mathematical models or algorithms for specific functions therein.

The data preparation and curation element 150 performs a parsing 151 of information in the sensor data 112 to derive certain characteristics of the objects 101. These characteristics may include identifying the sensor type 152 from which the data 112 was collected, and identifying each sensor's positional coordinates 153 (the sensor 120 capturing the object 101, and any other sensors 120 at the observed roadway 104 or traffic intersection 105), which are used in the translation element 160 as discussed below to convert object information from native coordinates of the particular sensor 120 used in the traffic detection system 106 into geospatial or geolocation coordinates, such as for example Global Positioning System (GPS) coordinates, for determining each object's location and for eventual rendering as an overlay 176 on a map 178 of the roadway 104 or traffic intersection 105. The characteristics identified in the parsing function 151 also include an identification and classification 154 of an object type, also as described further below. The data preparation and curation element 150 then generates a set of parsed information, that at least includes sensor data, sensor location data, and object type data.

The present invention is capable of identifying and classifying many different types of objects 101. For example, the object 101 may be a motorized vehicle, such as passenger vehicle, a truck or other commercial vehicle, a motorcycle, a motorized scooter, a wheelchair, a bus, an emergency vehicle, or any other type of vehicle that is powered by electrical or mechanical means. Additionally, the object 101 may be a bicycle, a skateboard, a manually-powered scooter, a manually-powered wheelchair, a baby carriage, a pedestrian, a pedestrian using a walking aid, an animal, or a fallen object in the roadway or intersection, such as for example a downed power pole or power line, or a fallen tree. Still further, the object 101 may be an incident occurring in the observed roadway 104 or traffic intersection 105. It is to be understood that the traffic visualization platform 100 is capable of identifying and classifying any type of object 101, and accordingly the present invention is not intended to be limited by any specific type of object 101 listed herein.

The identification and classification 154 of an object type may be performed by one or more algorithms that analyze contents of signals generated by the one or more sensors

120. One approach is by performing a pixel analysis, in which one or more pixel attributes in signals detected by the one or more sensors relative to a traffic detection zone representing an observed roadway 104 and traffic intersection 105 are evaluated to identify and classify an object 101 in the field of view of the traffic detection zone. Pixel attributes may be evaluated in many different ways to perform the identification and classification functions of the data preparation and curation element 150 according to the present invention.

For example, the traffic visualization platform 100 may classify an object 101 by associating groups of moving pixels having common pixel characteristics. This represents an analysis of the field of view to distinguish between foreground objects and background objects. Such an analysis processes temporal information in the traffic detection zone to analyze the foreground of the field of view, and processes spatial information to learn a detection zone background model. This temporal associates data points, such as for example pixels, uses common data point characteristics and attempts to identify one or more groups of moving data points. Common data point characteristics enable an initial identification of a group of moving data points as a foreground object, and these at least include a color, a luminance, a position, and movement of the data points to identify an object in motion. The present invention may further determine if a group of moving pixels represent one or more foreground objects inside the observed roadway 104 and traffic intersection 105, and identify an object type of the one or more foreground objects based on dominant object type features. Such features include pixel intensity, edges, texture content, shape, object attributes, and object tracking attributes for each object type.

The detection zone background model may be applied to examine specific data point attributes within the observed roadway 104 and traffic intersection 105, and attempt to adaptively learn what is in the background over time. The learned model is then applied to differentiate all of or a portion of data points in the traffic detection zone from known background objects. In this manner, the traffic visualization platform 100 extracts multi-dimensional spatial features, and then learns statistical thresholds for background characteristics, resulting in an adaptive model of the background that is continuously generated and adjusted as additional sensor data 112 is ingested. Through this process of analyzing spatial information, the traffic visualization platform 100 may continually learn what objects are part of the background to aid in the classification and identification 154 of objects 101 in the foreground. Background characteristics may include one or more of a roadway surface, roadway or lane markings, and roadway shadows within the observed roadway 104 and traffic intersection 105. These may include permanent and temporary characteristics as well as items which change over time at different rates. Examples of the multi-dimensional data point attributes include a pixel histogram, directional edges, a gray scale mean, a motion analysis (optical flow), frame difference data, and corner features.

The data preparation and curation element 150 also performs a curation 156 of the parsed information in the sensor data 112 to filter noise from the sensor data 112. This is carried out to identify 157 erroneous, missing, or stagnating data points within the identified characteristics of each object 101. The traffic visualization platform 100 also imputes 158 any data identified as missing from the parsed information, and removes 159 erroneous data, to create a more viable set of object information for translation in the translation element 160 and visualization in the mapping and animation element 170.

The process of filtering or removing noise in the curation 156 function of the data preparation and curation element 150 may be accomplished using several different approaches identify 157 and remove 159 erroneous data points. For example, the traffic visualization platform 100 may perform one or more statistical analyses on the input data 110 that attempt to remove data points that are outside a statistical probability of occurrence. For example, if a suspected object appears 100+ times within 10 seconds within a 5 square meter area, it is probably the result of an error in the sensor 120, and may be rejected. Alternatively, curation 156 may include an analysis of boundary conditions based on -pre-defined, normal characteristics of objects 101. In such a boundary analysis, where an object is smaller than or greater than the pre-defined boundary condition, the object 101 may be considered noise and therefore removed from the set of data points that represent an object 101. A further alternative approach utilizes the object's location; if the object's GPS coordinates (for example, computed using the translation element 160 as below) are inconsistent with object location as determined from different directional views or different viewing angles of other sensors 120, then the data points may be considered erroneous and removed from a dataset. Such an approach may therefore include evaluating data that is provided as feedback to the data preparation and curation element 150 from the translation element 160.

The data preparation and curation element 150 also evaluates data sets for missing data, and imputes 158 missing information for each object 101. This may also be accomplished using multiple approaches, such as for example where analysis of an image suggests that an object 101 is present at a particular location, but certain information is missing from available data (such as, a field of view in a particular sensor is occluded due to inclement weather) such that the GPS coordinates cannot be fully confirmed, the present invention may apply a pixel analysis of the original image to evaluate an image and impute a location of an object 101. Data as to object type 153 may also be imputed 159, for example by application of a statistical analysis that analyzes a probability that an object 101 is likely to be of a specific type based on a comparison with existing or known information.

The translation element 160 of the present invention performs the functions of deriving 162 a location of each object 101 that represents its physical location converted into a set of global positioning system (GPS) coordinates relative to the observed roadway 104 or traffic intersection 105, based on the native coordinates of the particular sensor 120 used in the traffic detection system 106 to capture the object 101 initially. This information may later be used to calculate and track movement 164 of each object 101 from one location to another within the field of view in the data preparation and curation elements 150. This may be accomplished in one or more mathematical models and algorithms configured to calculate a speed of a detected object 101 and its change in position over time based on the GPS coordinates representing the object's location.

Deriving 162 each object's location in a field of view of a sensor 120 to discern its GPS coordinates may be performed by one or more mathematical models or algorithms that further analyze location information of the one or more sensors 120. This may be accomplished using many different approaches, each of which begins with the geospatial coordinates, such as Global Positioning System (GPS) coordinates provided by the GPS satellite navigation system, of the sensor 120 capturing the particular piece of input data 110 relative to that object 101.

In one such approach, the translation element 160 derives 160 each object's 101 location and converts this information into real-time GPS coordinates, by relating the GPS coordinates of the acquiring sensor 120 to GPS coordinates of other sensors 120 in the same roadway 104 or traffic intersection 105, and confirm the position of each object 101. For example, the translation element 160 may acquire data relating to an object 101 from three different sensors 120 in the observed roadway 104 or traffic intersection 105, and triangulate data points therein to provide at least an initial confirmation of the location of each object 101 in terms of its GPS coordinates.

The translation element 160 then extrapolates the viewed location of the object 101 based on a defined field of view of a selected sensor 120 in conjunction with the sensor's GPS coordinates, relative to either image attributes or other representations of the observed roadway 104 or traffic intersection 105, to convert the location of the object 101 into positional coordinates and further confirm the object's spatial characteristics relative to the traffic environment 103. This also may be accomplished in several different ways. In one embodiment, where the selected sensor 120 is a camera-based system 121, the translation element 160 may extrapolate the viewed location of the object 101, and identify that location, by analyzing sensor characteristics relative to the field of view, such as for example the direction in which the camera 120 is pointing, and at what angle the camera 120 is positioned, together with knowledge of the sensor's GPS coordinates, to arrive at GPS coordinates of an object 101.

Alternatively, in another embodiment, where the selected sensor 120 is a camera-based system 121, the translation element 160 may extrapolate the viewed location of the object 101, and identify its location, using a pixel analysis of the image(s) captured by the camera-based system 121. One or more algorithms in such a pixel analysis that counts pixels to determine position, using different formulas for each of the X, Y, Z directions. By way of example, a count of 10 pixels may equate to 3 meters in the Z direction, whereas a count of 10 pixels may equate to 10 meters in the X and Y directions, and so forth. In other words, depending on the field of view, and different numbers of pixels may equate to different distances relative to the X, Y and Z directions, from which the translation element 160 may determine the GPS coordinates of an object 101.

In a further embodiment where the selected sensor 120 is a camera-based system 121, the translation element 160 may extrapolate the location of an object 101 based on an analysis of pixel intensity, and a rate of change thereof. For example, because an object 101 may be in motion and its position dynamic, velocity of an object 101 may be analyzed by a rate of pixel change in the field of view of the camera-based sensor 120.

In yet another embodiment where the selected sensor 120 is a camera-based system 121, the present invention may utilize a pre-established reference point at the observed roadway 104 or traffic intersection 105 to define other geospatial points in the field of view. For example, the present invention may compare pixels representing the object 101 in the field of view to pixels representing a stop bar at a traffic intersection 105, or lane markers in the observed roadway 104, and measure the number of pixels between the object 101 and reference point to establish positional coordinates of the object 101.

The translation element 160 may also extrapolate the viewed location of the object 101 where the acquiring sensor 120 is a radar system 121, in conjunction with GPS coordinates of the sensor. In this scenario, the translation element 160 may extrapolate the viewed location of the object 101 by identifying the field of view of the radar system (as with the camera system 120, the direction in which the radar system 121 is propagating signals, and at what angle the radar system 121 is positioned relative to the observed roadway 104 or traffic intersection 1045), and then utilizes object data captured by the radar system 121 to correlate the object's position in the field of view with the radar system's positional coordinates to map the GPS coordinates of the object 101.

Analyzing sensor characteristics relative to a field of view for deriving the location of an object 101 may be accomplished by applying sensor awareness techniques that use devices or systems associated with the sensors 120 to determine sensor characteristics for use as a reference. For example, the framework 100 may discern the location of the sensor 120 using an onboard GPS system as reference. Also, the framework 100 may utilize a compass on board the sensor 120 to discern the direction in which the sensor 120 is pointing.

The framework 100 may utilize one or more algorithms as noted above that perform a pixel analysis of the image(s) captured by a sensor 120. Such algorithms apply a pixel-to-distance referencing framework to count pixels for determining position by applying formulas for each of the X, Y, Z directions. Such a framework performs two types of object location estimation techniques: a manual technique, and an automatic technique.

In the manual technique, a user applies the pixel-to-distance referencing framework to reference pixels in the X direction (e.g., bottom edge) of the field of view, and correlates those pixels to physical width distances (such as feet), for example by assuming that the bottom edge is 75 feet across. The user then applies the pixel-to-distance referencing framework to reference Y-direction pixels to discern the depth of the field of view, for example by assuming that the distance in the Y-direction from bottom-to-top (and centered by the X-direction) refers to a specific depth, such as 800 feet in depth. Further, the user then applies pixel-to-distance referencing framework 100 to assign a height of any object 101 in the field of view to reference the Z direction, to establish heights for all objects 101 in any depth.

The automatic technique of the pixel-to-distance referencing framework may instead use attributes of commonly-known objects (e.g., car lengths, pedestrian height, traffic signage/apparatus, sun diameter, moon diameter) to establish pixel reference points in the X, Y and Z directions. These may also be used to automatically adjust or tweak the pixel-to-real-world mapping performed in the manual technique.

The present invention may use either the manual technique or the automatic technique for setup of the pixel mapping aspect, or to use the automatic technique (e.g., tweaking) system to setup the pixel-to-distance referencing framework based on the user's configurations.

Determining the GPS coordinates of the location of an object 101 by applying a formula, such as $$\text{ObjectGPS} = \text{ConvertToGPS}(\text{ObjectXYPixel}, \text{SensorGPS})$$

where ConvertToGPS is a function that uses the pixel-to-distance framework above, and the location of the acquiring sensor (SensorGPS) to discern object location. The outcome, ObjectGPS, is a represented as a tuple comprised of [longitude, latitude].

The translation element 160 of the traffic visualization platform 100 is also configured to prepare the parsed and curated information for visualization on a display interface 192. The translation element 160 executes this function in one or more mathematical models and/or algorithms that may initially take location information for each object 101 represented as real-time geospatial coordinates, such as Global Positioning System (GPS) coordinates, to calculate and track movement of each object 101 to ascertain motion data for each object 101. Ascertaining motion data involves calculating a speed and change in position of each object 101, and this may also be accomplished in many different ways. For example, one way to calculate the speed and change in position of an object 101 is by associating the object 101 with its position relative to trigger points identified within a field of view of a sensor 120 to determine both a distance between one point and another point (spatial information), and also a time for the object 101 to pass from one trigger point to another trigger point (temporal information). It is to be understood that many methods of calculating a speed and change in position of an object to ascertain and track is movement are possible, and within the scope of the present invention.

The translation element 160 then characterizes the motion data 164 of each object 101 as a series of locations relative to the reference point for the observed roadway 104 or traffic intersection 105. This is performed by first identifying a native capture time of the sensor 120 generating the information for each object 101, and then correlating the series of locations to the native capture time. The translation element 160 then sequences the series of locations by a time interval 166 between different locations, for example based on the geospatial points, to define the motion of each object 101.

This time interval varies according to multiple factors. These factors include the native capture time of the sensor, for example a frame rate of a video system, or a time of s signal captured from a radar system. Additionally, the translation element 160 may account for the capability of geospatial conversion processing algorithms to derive location data in real-time, as this may limit the speed at which objects 101 are able to be displayed. Other factors are the speed of transmission, such as the bandwidth of the communication system, and the computer or computers on which the information is displayed, each of which may also impact the speed at which display of the object motion can occur within the traffic visualization platform 100, and consequently, the time interval selected and applied to define the motion of the object 101 on the display interface 192.

The outcome of the data parsing and curation element 150 and the translation element 160 is a set of derivative data representing one or more objects 101 and other information of interest in an observed roadway 104 or traffic intersection 105. The mapping and animation element 170 then takes this resulting derivative data, comprised of converted and correlated location data, and other relevant information such as object type, and prepares it for display of rendered traffic information. The mapping and animation element 170 prepares information for display by initiating and/or creating a digitized map 172 of the observed roadway 104 or traffic intersection 105. The map 172 may represent the observed roadway 104 or traffic intersection 105 in many different formats. For example, the map 172 may display a single intersection, a single roadway, a single approach, or multiple intersections, roadways and approaches. The map 172 may also present the observed roadway 104 or traffic intersection 105 in a combination of single and multiple elements, for example by highlighting particular approaches at a single intersection. The user 109 may customize views of the observed roadway 104 or traffic intersection 105 shown by map 172, for example using the traffic management support tool 190.

The digitized map 172 may be a natively-generated representation of the observed roadway 104 or traffic intersection 105, or may be an image or representation acquired by the by the traffic visualization platform 100 from an external source, such as a provider of satellite imagery of the location of the observed roadway 104 or traffic intersection 105. It is to be understood that any type of digital representation of the observed roadway 104 or traffic intersection 105 may be utilized, and is within the scope of the present invention, and therefore the current specification and claims are not to be limited to any one type of map 172 specifically referenced herein.

The mapping and animation element 170 also generates an overlay 174 for map 172 as a digitized representation of sensor data 112. This includes a representation of one or more objects 101 at the observed roadway 104 or traffic intersection 105, and any information to the object 101. The overlay may further include other information that is not collected by sensor data 112, such as traffic signal information (for example, indicating a current phase cycle and phase cycle timing), public or mass transit information, such as roadway usage by such vehicles and schedule times relative to the observed roadway 104 or traffic intersection, and information about emergency vehicles in or near the observed roadway 104 or traffic intersection 105. Many other types of information may be prepared and shown as part of the overlay 174, and it is to be understood that the present invention is not to be limited to particular types of information referenced herein.

The mapping and animation element 170 further generates a dynamic animation 176 of the objects 101 for display on the display interface 192 based on the converted location data from the translation element 160. The dynamic animation is presented together with the overlay 174 on the map 172 to indicate movement of the objects 101 at the observed roadway 104 or traffic intersection 105.

One or more icons 178 may be further created to represent various roadway users, such as objects 101. Icons 178 may be presented in many different ways on the display interface 192. For example, objects 101 themselves may be represented icons 178. Additionally, users 194 may be presented with a larger version of each icon 178, or a different icon 178, for each object 101 when hovering a cursor over the object 101 on the display interface 192. Icons 178 may also be used to represent the traffic signals and roadway elements such as lanes, lane markings, and obstacles (such as for examples trees or signs) at the observed roadway 104 or traffic intersection 105. Icons 178 may therefore be used to digitally represent any object 101 or feature of the observed roadway 104 or traffic intersection 105, and any type of representation may be used as an icon 178.

Displayed objects 101 (and other relevant information for the user 109) may also be identified according to their importance to the user 109. Digital representations such as labels may therefore also be generated by the traffic visualization platform 100, such as for example to indicate near-miss collisions, objects 101 traveling over the posted speed limit or surveyed speed limit, and any other information desired by the user 109.

As noted above, the traffic visualization platform 100 may include a traffic management support tool 190, and such a support tool 190 is configured to support the follow-on utility of the output data 180. The traffic management support tool 190 may be utilized by a user to observe classifications 181 and counts 182 of objects 101 at an observed roadway 104 or traffic intersection 105, any alarms 183 generated at the observed roadway 104 or traffic intersection 105, and speeds 184 and trajectories 185 of objects 101 therein. The traffic management support tool 190 may be further utilized to perform activities such as generating traffic analytics 187 and generating and managing reports 188 of the output data 180.

The traffic management support tool 190 may also be utilized to manage and monitor functions such as adjusting or extending 186 a traffic signal controller at or near the observed roadway 104 or traffic intersection 105, and/or phase cycle timings of such a traffic signal controller. The traffic visualization platform 100 may therefore be configured to generate one or more signals or instructions for such a traffic signal controller in response to the output data 180.

The traffic management support tool 190 may also be utilized to generate and provide data to external systems 189. Such systems 189 may include external traffic management systems and traffic signal controller systems, for example as a signal to adjust or extend phase cycle timings for out-of-network traffic signal controllers that may be affected by traffic conditions at the observed roadway 104 or traffic intersection 105.

The traffic management support tool 190 may enable users 109 to customize how information is viewed on the display interface 192, and generate custom digital representations for display. As noted above, displayed objects 101 and other relevant information may be indicated by digital representations, such as labels or icons 178, for example to indicate near-miss collisions, objects 101 traveling over the posted speed limit or surveyed speed limit, etc. These digital representations may be customized by the user 109 using the traffic management support tool 190.

The traffic management support tool 190 may include widgets, drop-down menus, and other indicia presented via the display interface 192 that enable a user to make selections and perform functions attendant to operation of the traffic visualization 100, or customize the information presented therein. A user 109 may interact with the support tool 190 via an application resident on a computing device and/or using a graphical user interface, and various settings of the traffic visualization platform 100 may be configured using the traffic management support tool 190, such as for example the size, type and color of a map 172, icons 178, or other digital representations. It is to be understood that many settings are possible within the traffic visualization platform 100, and the present invention is not to be limited to any one function of the traffic management support tool 190 relative to adjusting settings or configuring functions of the platform 100.

As noted above, the maps 172, overlays 174, dynamic animations 176, and icons 178 or other digital representations may be recorded, stored in a database, and played back at a later time. Playback of the information presented on a display interface 192 may include a replay function that displays historical information for a specified or defined time period. The playback speed may be varied from 'slow' to 'fast' in various increments, and both the period of time specified by the user, and speed of playback, are examples of customizations that may be directed by the user 109.

Other types of information may also be displayed on the interface 192. For example, weather information may be ingested by the traffic visualization platform 100 and displayed along with object 101 information and other related information to show the user 109 the interaction between traffic conditions such as, for example, visible traffic flow, and the existing weather conditions at the observed roadway 104 and traffic intersection 105, such as fog, rain, hail, snow, etc., and roadway conditions such as the presence of ice.

The present invention also contemplates that many layers of application programming interfaces (APIs) may be utilized within the traffic visualization platform 100, for example to enable ingest of particular types of input data 110, or for accessing or distributing customized uses of the output data 180. One layer of APIs may be utilized to connect incoming sensor data 112 with the traffic visualization platform 100 itself. Different APIs may be provided for each type of sensor 120, as each sensor 120 may generate data having different formats, and may require pre-processing to format the data to be analyzed. APIs may be managed by an API element 136 specifically configured to enable the APIs, for example as a specific sub-module of the data ingest and initialization element 140 for intake of certain types of information that require a particular format or conversion from a particular format. The data ingest and initialization element 140 may itself be thought of as a layer of APIs configured to ingest and initialize input data 110.

A further layer of APIs may be provided for output data 180. One or more APIs may be developed to enable the follow-on forms of the output data 180 as discussed above. Third parties, for example, may utilize such APIs to develop their own, follow-on uses of the output data 180, such as to customize alarms, analytics, reports, recommendations, or signals or instructions provided third-party or external systems 189. APIs may also be provided to enable customized interfaces via the traffic management support tool 190 for visualizing information with the traffic visualization platform 100.

Communications within the traffic visualization platform 100 may include both wired and wireless methods of transmitting data. For example, the traffic detection system 106 may transmit data using either wired connections, such as from sensors to traffic controller cabinets or other locations proximate to roadways 104 or traffic intersections 105, or via wireless signals. Similarly, information may be transmitted from traffic controller cabinets or other locations proximate to roadways 104 or traffic intersections 105 (or from traffic detection systems 106 directly) using either wired connections or wireless signals. Any type of wireless communications protocols may be utilized in the traffic visualization platform 100, such as cellular networks, Bluetooth connections, Wi-Fi (wireless local area networking) connection, DSRC (dedicated short-range communications), NFC (near-filed communications) or any other form of wireless transmission.

Figure 2:
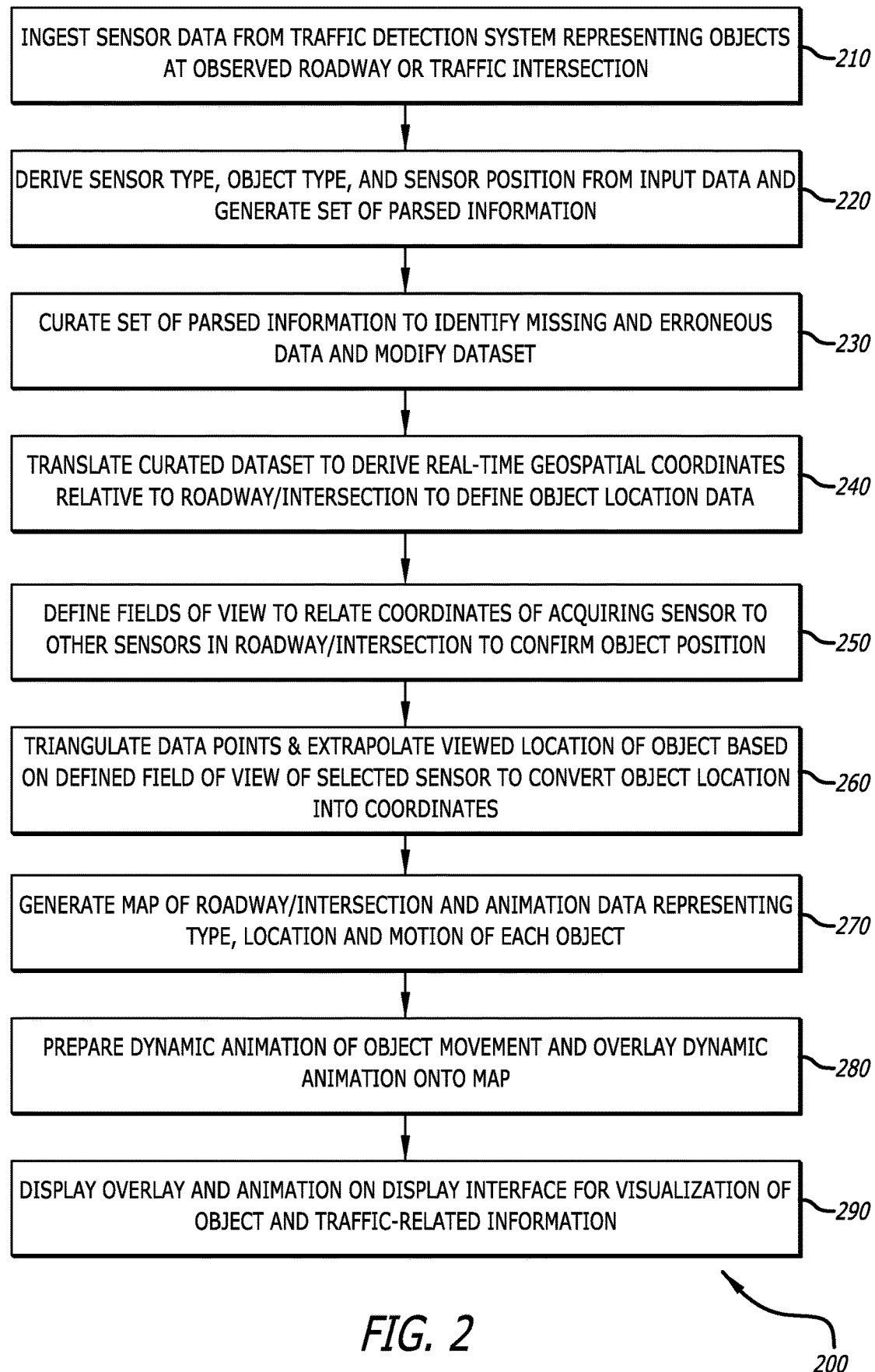
FIG. 2 is a flowchart of steps in a process of performing the traffic visualization platform according to one embodiment of the present invention.

FIG. 2 is a flowchart illustrating steps in a process 200 for performing the traffic visualization platform 100, according to one or more embodiments of the present invention. Such a process 200 may include, as noted above one or more functions, mathematical models, algorithms, machine learning processes, and data processing techniques for the data processing elements 134 within such a platform 100, and for the various functions of each element 134.

The process 200 is initialized at step 210 by ingesting input data 110 collected by sensors 120 and representing one or more objects 101 captured within a field of view at or near an observed roadway 104 or traffic intersection 105. This information is communicated to the data preparation and curation element 150 to perform the parsing 151 and curation 156 functions. The process 200 therefore continues by deriving characteristics of each object 101 at step 220, such as for example an identifying object type, the type of sensor 220 generating the input data 110 for each object 101, and of the geospatial coordinates (such as GPS coordinates) of the capturing sensor and all other sensors 120 at the observed roadway 104 or traffic intersection 105. This step produces a set of parsed information which is then curated at step 230 to produce a modified dataset, by identifying missing information for each object 101, as well as information that is not useful, such as erroneous, anomalous, and stagnant information for each object 101. Missing information is imputed for each object 101 where possible, and information that is not useful is deleted from the set of parsed information.

The process 200 then passes the set of parsed information to the translation element 160 to translate the curated, modified dataset at step 240, to begin preparing the object information for rendering on a display interface 192. At step 240, the process 200 derives spatial characteristics of each object 101, and converts this information into location data represented as real-time geospatial coordinates relative to the field of view for each sensor 120 to define the location of each object 101. At step 250, the process 200 defines the fields of view for each sensor 120 to relate the geospatial coordinates of the acquiring or capturing sensor 120 to other sensors 120 at the observed roadway 104 or traffic intersection 105.

At step 260, the object's location is converted into a set of GPS or other geospatial positional coordinates by triangulating data points relative to the object's position in the fields of view of the other sensors 120 to confirm the position of each object 101, and extrapolating the viewed location of each object 101 based on the defined field of view of the selected sensor 120, as described in detail above. The process 200 may also characterize movement of each object 101 to define motion data, as a series of locations relative to the reference point, based on the native capture time of the sensor 120 that produced the input data 110 for each object 101. This is performed, as noted above, by identifying the native capture time of the sensor 120 generating the information for each object 101, correlating the series of locations to the native capture time, and sequencing the series of locations by a time interval between different locations to define the motion data for movement of each object 101.

At step 270 of the process 200, the mapping and animation element 170 generates a digitized map 172 of the observed roadway 104 or traffic intersection 105, and animation data representing the type, location, and motion of each object 101 to be displayed. At step 280, the mapping and animation element 170 creates an overlay 174 of the animation data onto the digitized map 174 as a dynamic animation 176 of activity at the roadway 104 or traffic intersection 105. At step 290, the process 200 displays the dynamic animation 174 as an overlay 176 on the digitized map 172 on a display interface 192, together with all other relevant data for that particular location, such as speed data 114, roadway and intersection data 116, information relating to a traffic signal controller 117, signal and phase cycle timing data 118, etc.

Figure 3:
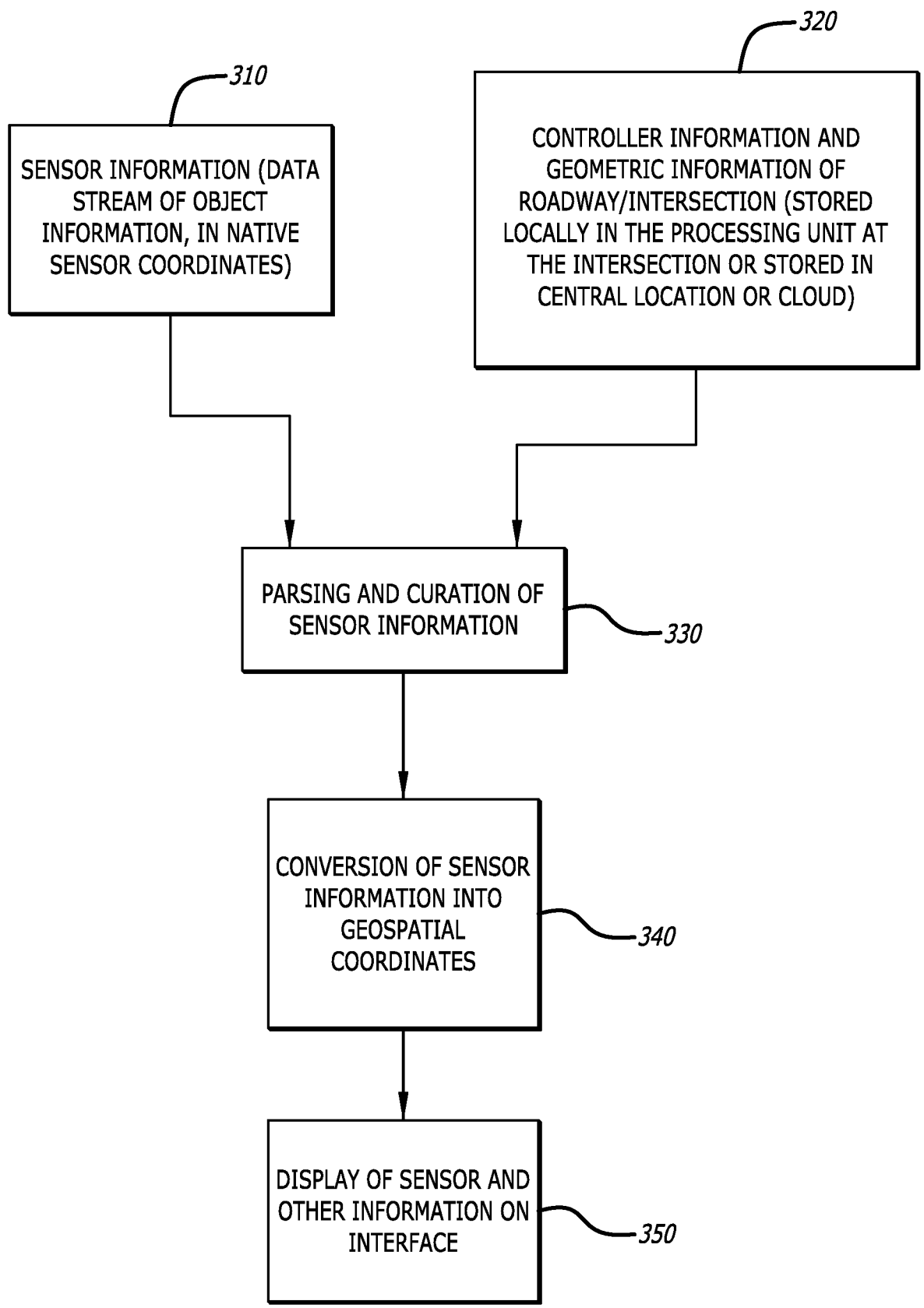
FIG. 3 is a further chart outlining inputs and functions in a traffic visualization platform according to the present invention.

FIG. 3 is a further flowchart outlining data flow of inputs to high-level functions within the traffic visualization platform 100, according to the present invention. Blocks 310 and 320 represent incoming sensor data 112 and other types of input data 110, such as for example roadway and intersection data 116 and traffic signal controller data 117. Sensor data 112 may be provided as a stream of information, represented for example as (where the sensor 120 is a camera-based imaging system 121)

Cam1,06052019 12:03:54.325,Bike,021,100,120

|Sensor|-----------Date&Time---|Type|Sensor obj location|

The roadway intersection data 116 and traffic signal controller data 117, and any other relevant information not collected by sensors 120, may be stored locally at a traffic signal controller in operation at the roadway 104 or traffic intersection 105, or stored in a central location or in a cloud computing environment or system.

This incoming information is then provided to block 330 for parsing and curation of the sensor information, and then to block 340 for conversion of the parsed and curated sensor information into geospatial coordinates, as discussed in detail above. The resulting geospatially-converted data stream element may be represented for example as:

Obj123,06052019 12:03:54.325,Ped,122.456375, 55.348723

|Obj ID|-------------Date&Time--|Type|Latitude/Longitude|

At block 350, the converted data stream is then displayed on an interface 192 as an overlay 174 on a map 172, where one or more elements of the data stream or presented as a dynamic animation 176 of objects 101 detected within the traffic detection system 106.

It is to be understood that the geospatial coordinates may be provided for sensors 120 relative any existing satellite navigation system, and that Global Positioning System (GPS) coordinates provided by the GPS satellite navigation system are but one type of coordinate system that may be utilized. Similarly, the present invention may convert location data into any type of geospatial coordinates, relative to any type of satellite navigation system, and therefore the present invention is not intended to be limited to any one type of coordinate system or relative to any one type of satellite navigation system referenced herein.

The systems and methods of the present invention may be implemented in many different computing environments 130. For example, they may be implemented in conjunction with a special purpose computer, a programmed microprocessor or microcontroller and peripheral integrated circuit element(s), an ASIC or other integrated circuit, a digital signal processor, electronic or logic circuitry such as discrete element circuit, a programmable logic device or gate array such as a PLD, PLA, FPGA, PAL, GPU and any comparable means. Still further, the present invention may be implemented in cloud-based data processing environments, and where one or more types of servers are used to process large amounts of data, and using processing components such as CPUs, GPUs, TPUs, and other similar hardware. In general, any means of implementing the methodology illustrated herein can be used to implement the various aspects of the present invention. Exemplary hardware that can be used for the present invention includes computers, handheld devices, telephones (e.g., cellular, Internet enabled, digital, analog, hybrids, and others), and other such hardware. Some of these devices include processors (e.g., a single or multiple microprocessors or general processing units), memory, nonvolatile storage, input devices, and output devices. Furthermore, alternative software implementations including, but not limited to, distributed processing, parallel processing, or virtual machine processing can also be configured to perform the methods described herein.

The systems and methods of the present invention may also be wholly or partially implemented in software that can be stored on a non-transitory computer-readable storage medium, executed on programmed general-purpose computer with the cooperation of a controller and memory, a special purpose computer, a microprocessor, or the like. In these instances, the systems and methods of this invention can be implemented as a program embedded on a mobile device or personal computer through such mediums as an applet, JAVA® or CGI script, as a resource residing on one or more servers or computer workstations, as a routine embedded in a dedicated measurement system, system component, or the like. The system can also be implemented by physically incorporating the system and/or method into a software and/or hardware system.

Additionally, the data processing functions disclosed herein may be performed by one or more program instructions stored in or executed by such memory, and further may be performed by one or more modules configured to carry out those program instructions. Modules are intended to refer to any known or later developed hardware, software, firmware, machine learning, artificial intelligence, fuzzy logic, expert system or combination of hardware and software that is capable of performing the data processing functionality described herein.

The foregoing descriptions of embodiments of the present invention have been presented for the purposes of illustration and description. It is not intended to be exhaustive or to limit the invention to the precise forms disclosed. Accordingly, many alterations, modifications and variations are possible in light of the above teachings, may be made by those having ordinary skill in the art without departing from the spirit and scope of the invention. It is therefore intended that the scope of the invention be limited not by this detailed description. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. A method, comprising:
receiving, as input data, information collected by a traffic detection system comprised of one or more sensors, and representing one or more specific objects within a traffic environment;
analyzing the input data in a plurality of data processing elements within a computing environment that includes one or more processors and at least one computer-readable non-transitory storage medium having program instructions stored therein which, when executed by the one or more processors, cause the one or more processors to execute the plurality of data processing elements to generate digital representations of the one or more specific objects for viewing as a dynamic animation on a display interface, by:
parsing the information collected by the traffic detection system to identify characteristics of the one or more specific objects and the traffic detection system, the characteristics including a type of each object in the one or more specific objects, a type of sensor capturing each object, and positional coordinates of the sensor capturing each object, to generate a set of parsed information,
curating the set of parsed information to identify and remove missing and erroneous characteristics of each object,
deriving location data for each object relative to the traffic environment, by extrapolating a viewed location of each object from a field of view of the type of sensor capturing each object,
characterizing the location data by calculating a speed and change in location of each object relative to the traffic environment, by associating each object with its location relative to one or more reference points identified within the field of view to ascertain both spatial and temporal changes in the location data for each object, and
converting the location data into real-time geospatial coordinates; and
generating object animation data representing the digital representation of the type of each object and the location data of each object for display on a map of the traffic environment.

2. The method of claim 1, further comprising overlaying the object animation data onto the map for visualization of the information collected by the traffic detection system as a dynamic animation of the traffic environment on the display interface.

3. The method of claim 1, wherein the information collected by a traffic detection system is sensor data collected by one or more sensors.

4. The method of claim 3, wherein the one or more sensors include at least one of an imaging system, a radar system, a loop sensor, a magnetometer, a piezo sensor, an acoustic sensor, and ultrasonic sensor, and an air pressure sensor.

5. The method of claim 1, wherein the parsing the information collected by the traffic detection system to identify characteristics of the one or more specific objects further comprises filtering the information collected from the traffic detection system according to a type of sensor, and identifying a native frame rate of each type of sensor.

6. The method of claim 1, wherein the parsing the information collected by the traffic detection system to identify characteristics of the one or more specific objects further comprises identifying the type of sensor capturing each object, and identifying the positional coordinates of the sensor capturing each object and positional coordinates of each type of sensor in the traffic detection system.

7. The method of claim 1, further comprising classifying each object as one or more of a bicycle, a motorcycle, a truck, a passenger vehicle, a commercial vehicle, a pedestrian, and an incident to determine the object type.

8. The method of claim 1, wherein the characterizing the location data further comprises tracking a trajectory of each object by identifying a series of locations relative to the reference point, identifying a native capture time of the sensor generating the information for each object, correlating the series of locations to the native capture time, and sequencing the series of locations by a time interval between different locations based on the geospatial coordinates.

9. The method of claim 1, further comprising generating one or more icons on the dynamic animation of the traffic environment depicting the one or more the specific objects.

10. The method of claim 1, wherein the traffic environment is at least one of a signalized intersection, a roadway, a bicycle path, a pedestrian path, and a highway.

11. A system for visually representing traffic objects at a traffic environment on a display interface, comprising:
 a data collection element configured to receive input data comprised of information collected by a traffic detection system comprised of one or more sensors and representing one or more specific objects within a traffic environment;
 a data preparation and curation element configured to parse the information collected by the traffic detection system to identify characteristics of the one or more specific objects and the traffic detection system, the characteristics including a type of each object in the one or more specific objects, a type of sensor capturing each object, and positional coordinates of the sensor capturing each object, to generate a set of parsed information and curate the set of parsed information to identify missing and erroneous characteristics of each object;
 a translation element configured to derive location data for each object relative to the traffic environment, by extrapolating a viewed location of each object from a field of view of the type of sensor each object, characterizing the location data by calculating a speed and change in location of each object relative to the traffic environment by associating each object with its location relative to one or more reference points identified within the field of view to ascertain both spatial and temporal changes in the location data for each object, and converting the location data into real-time geospatial coordinates; and
 a mapping and animation element, configured to generate object animation data representing the digital representation of the type of each object and the location data of each object for display on a map of the traffic environment.

12. The system of claim 11, wherein the mapping and animation element is further configured to overlay the object animation data onto the map for visualization of the information collected by the traffic detection system as a dynamic animation of the traffic environment on the display interface.

13. The system of claim 11, wherein the one or more sensors include at least one of an imaging system, a radar system, a loop sensor, a magnetometer, a piezo sensor, an acoustic sensor, and ultrasonic sensor, and an air pressure sensor.

14. The system of claim 11, wherein the data preparation and curation element is further configured to filter the information collected from the traffic detection system according to a type of sensor and identify a native frame rate of each type of sensor.

15. The system of claim 11, wherein the data preparation and curation element is further configured to identify the type of sensor capturing each object, and identify the positional coordinates of the sensor capturing each object and positional coordinates of each type of sensor in the traffic detection system.

16. The system of claim 11, wherein the data preparation and curation element is further configured to classify each object as one or more of a bicycle, a motorcycle, a truck, a passenger vehicle, a commercial vehicle, a pedestrian, and an incident to determine the object type.

17. The system of claim 11, wherein the translation element is further configured to track a trajectory of each object by identifying a series of locations relative to the reference point, identifying a native capture time of the sensor generating the information for each object, correlating the series of locations to the native capture time, and sequencing the series of locations by a time interval between different locations based on the geospatial coordinates.

18. The system of claim 11, wherein the mapping and animation element is further configured to generate one or more icons on the dynamic animation of the traffic environment depicting the one or more the specific objects.

19. The system of claim 11, wherein the traffic environment is at least one of a signalized intersection, a roadway, a bicycle path, a pedestrian path, and a highway.

20. A method of visually representing traffic objects at a traffic environment on a display interface, comprising:
 preparing input data collected by a traffic detection system comprised of one or more sensors and representing one or more specific objects within a traffic environment for a digital representation of the one or more specific objects on a display interface, by a) deriving a plurality of characteristics of the one or more specific objects and the traffic detection system from the input data to generate a set of parsed information, the plurality of characteristics including a type of each object in the one or more objects, a type of sensor capturing each object, and positional coordinates of the sensor capturing each object, and b) curating the set of parsed information to identify missing and erroneous characteristics of each object;
 translating a curated set of the parsed information to derive a location of each object, by extrapolating a viewed location of each object from a field of view of the type of sensor capturing each object, characterizing the location data by calculating a speed and change in location of each object relative to the traffic environment by associating each object with its location relative to one or more reference points identified within the field of view to ascertain both spatial and temporal changes in the location data for each object, and converting the location data into real-time geospatial coordinates; and generating object animation data representing the digital representation of the one or more objects comprised of the type of each object and the location data for display of the digital representation of the one or more specific objects on the display interface.

21. The method of claim 20, further comprising overlaying the object animation data onto a map for visualization of the information collected by the traffic detection system as a dynamic animation of the traffic environment.

22. The method of claim 20, wherein the one or more sensors include at least one of an imaging system, a radar system, a loop sensor, a magnetometer, a piezo sensor, an acoustic sensor, and ultrasonic sensor, and an air pressure sensor.

23. The method of claim 20, wherein the preparing input data collected by a traffic detection system further comprises filtering the input data according to a type of sensor and identifying a native frame rate of each type of sensor.

24. The method of claim 20, wherein the preparing input data collected by a traffic detection system further comprises identifying the type of sensor capturing each object, and identifying the positional coordinates of the sensor capturing each object and positional coordinates of each type of sensor in the traffic detection system.

25. The method of claim 20, further comprising classifying each object as one or more of a bicycle, a motorcycle, a truck, a passenger vehicle, a commercial vehicle, a pedestrian, and an incident to determine the object type.

26. The method of claim 20, wherein the translating a curated set of the parsed information further comprises tracking a trajectory of each object by identifying a series of locations relative to the reference point, identifying a native capture time of the sensor generating the information for each object, correlating the series of locations to the native capture time, and sequencing the series of locations by a time interval between different locations based on the geospatial coordinates.

27. The method of claim 20, further comprising generating one or more icons on the dynamic animation of the traffic environment depicting the one or more the specific objects.

28. The method of claim 20, wherein the traffic environment is at least one of a signalized intersection, a roadway, a bicycle path, a pedestrian path, and a highway.

* * * * *